(12) United States Patent
Lemmon et al.

(10) Patent No.: US 8,472,000 B1
(45) Date of Patent: Jun. 25, 2013

(54) ANIMATION STAND WITH MULTIPLE AXIS CAMERA SUPPORT

(75) Inventors: John Powell Lemmon, Charlotte, NC (US); Michael Scott Rosinski, Mint Hill, NC (US)

(73) Assignee: John Lemmon Films, Incorporated, Charlotte, NC (US)

( * ) Notice: Subject to any disclaimer, the term of this patent is extended or adjusted under 35 U.S.C. 154(b) by 1311 days.

(21) Appl. No.: 11/955,919

(22) Filed: Dec. 13, 2007

(51) Int. Cl.
*G03B 21/14* (2006.01)

(52) U.S. Cl.
USPC ............... 352/50; 434/85; 353/28; 352/52

(58) Field of Classification Search
USPC ............ 353/28, 119, 120, 79; 352/47, 50–53, 352/87, 243; 40/341, 361; 434/85, 88; 101/335
See application file for complete search history.

(56) References Cited

U.S. PATENT DOCUMENTS

| | | | |
|---|---|---|---|
| 9,409 A * | 11/1852 | Richter | 434/88 |
| 1,198,599 A | 9/1916 | Sudmann et al. | |
| 1,518,680 A * | 12/1924 | Arnot | 359/872 |
| 1,805,511 A | 5/1931 | Carpenter | |
| 1,919,735 A | 7/1933 | Lane | |
| 2,153,902 A | 4/1939 | Tondreau | |
| 2,198,006 A | 7/1940 | Garity | |
| 2,241,929 A | 5/1941 | Kendig | |
| 2,281,033 A | 4/1942 | Garity | |
| 2,283,997 A * | 5/1942 | Jensen | 269/16 |
| 2,571,613 A * | 10/1951 | Rissland | 434/91 |
| 2,711,022 A * | 6/1955 | Salfelder | 33/18.1 |
| 3,415,600 A | 12/1968 | Yarbrough | |
| 3,660,903 A * | 5/1972 | Caperton, Jr. | 33/276 |
| 3,800,441 A * | 4/1974 | Macpherson | 434/85 |
| 3,837,740 A * | 9/1974 | Johnson | 353/122 |
| 3,905,692 A * | 9/1975 | Hart | 352/52 |
| 4,265,624 A * | 5/1981 | Krulwich | 434/88 |
| 5,029,997 A * | 7/1991 | Faroudja | 352/54 |
| 5,052,797 A * | 10/1991 | Madsen | 353/28 |
| 5,088,814 A * | 2/1992 | Campbell | 353/44 |
| 5,506,640 A * | 4/1996 | Orlich | 353/28 |
| 6,481,851 B1 * | 11/2002 | McNelley et al. | 353/28 |
| 2004/0021837 A1 * | 2/2004 | Satomi | 353/122 |
| 2005/0046811 A1 * | 3/2005 | Mori et al. | 353/122 |

* cited by examiner

*Primary Examiner* — William C Dowling

(57) ABSTRACT

An animation stand which provides a camera support assembly that enables a camera to be positioned along any axis which allows users to create traditional, hand-made animation, specifically two-dimensional animation using a variety of art techniques and stop-motion animation of poseable figures and everyday objects.

4 Claims, 6 Drawing Sheets

ANIMATION STAND WITH MULTIPLE AXIS CAMERA SUPPORT

CROSS-REFERENCED TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to animation stands, specifically to animation stands which provide adjustable support for camera, lighting and backdrops for use in creating traditional, hand-made animation.

2. Prior Art

Traditional, or hand-made, animation is normally created in one of two ways: 1) Two dimensional animation involves creating a series of hand-drawn images. This type of animation is referred to as 'cel animation' or 'cartoon animation'. Images are procured by placing the drawings on a planar surface. Above that surface is a camera, connected to a horizontal support which is attached to a vertical column, which is attached to the planar surface (or base). This device is referred to as an 'animation stand'. 2) Stop-motion animation is created by moving physical three-dimensional objects, then procuring a still image of the object, then moving the object again and procuring another still image, and so on. The person creating the animation (the 'animator') sits at a table on which the object is placed. The camera is supported by a tripod, so that the camera is aimed in an approximately horizontal position. Thus, the animator is between the camera and the object being animated. The fact that one device is used to create two dimensional animation and a different device is used to create stop-motion animation results in these disadvantages:

1) The animator must spend extra time learning how to operate two devices instead of one.
2) The two devices consume excessive space.
3) It takes longer to set up the equipment.

There are several examples of animation stands that provide for the positioning of a camera for two-dimensional animation. Each of these devices provide a base on which the animation artwork is placed; they also provide a support attached to the base on which a camera is attached so that the camera is aimed down at the artwork. U.S. Pat. No. 3,905,692 to Hart (1975) shows such an arrangement. This allows the animator to create two dimensional animation only, specifically animation using a grease pencil. The design involves heating glass which could result in a safety hazard. U.S. Pat. No. 3,415,600 to Yarbrough (1968) describes another device that has limited functionality because it is usable only for two dimensional animation. Also, the complexity of the design necessitates that the animator spend a substantial amount of time learning how to operate the apparatus. U.S. Pat. No. 1,919,735 to Lane (1933) has the same limitations. The following designs have the disadvantages of being useable for two dimensional animation only, and of being designed in a way that does not allow portability, ease of storage and ease of use: U.S. Pat. No. 1,805,511 to Carpenter (1931), U.S. Pat. No. 2,153,902 to Tondreau (1939), and U.S. Pat. Nos. 2,198,006 and 2,281,033, both to Garity (1940, 1942).

There are also designs that provide for the creation of stop-motion animation with the camera being positioned on a tripod. U.S. Pat. No. 2,241,929 to Kendig (1941) and U.S. Pat. No. 1,198,599 to Sudmann and Hopkins (1916) show designs for creating stop-motion animation using three dimensional figures on a stage. The disadvantages of these designs are:

1) They can only be used for creating stop-motion animation and not for two dimensional animation.
2) After moving the object, the animator must move aside while the camera procures the still image; otherwise the animator will be in the shot.
3) Computer cables and power cords must extend along the floor for several feet to reach camera, computer and lights, which creates a safety hazard for the animator.
4) When these designs are used in a classroom setting it is likely that students will trip on tripod legs or power cords, which can ruin an animated scene and could cause injury.

What is needed is a design that allows the animator, whether an adult or child, to quickly and easily create both two dimensional and stop-motion animation. The design should also offer a means of supporting background artwork; and it should offer safety, portability and ease of storage.

SUMMARY

In accordance with one embodiment, an animation stand provides an adjustable means of support for camera, lighting and backdrops for use in creating hand-made two dimensional and stop-motion animation.

DRAWINGS

Figures

DRAWINGS

Figure 1A:
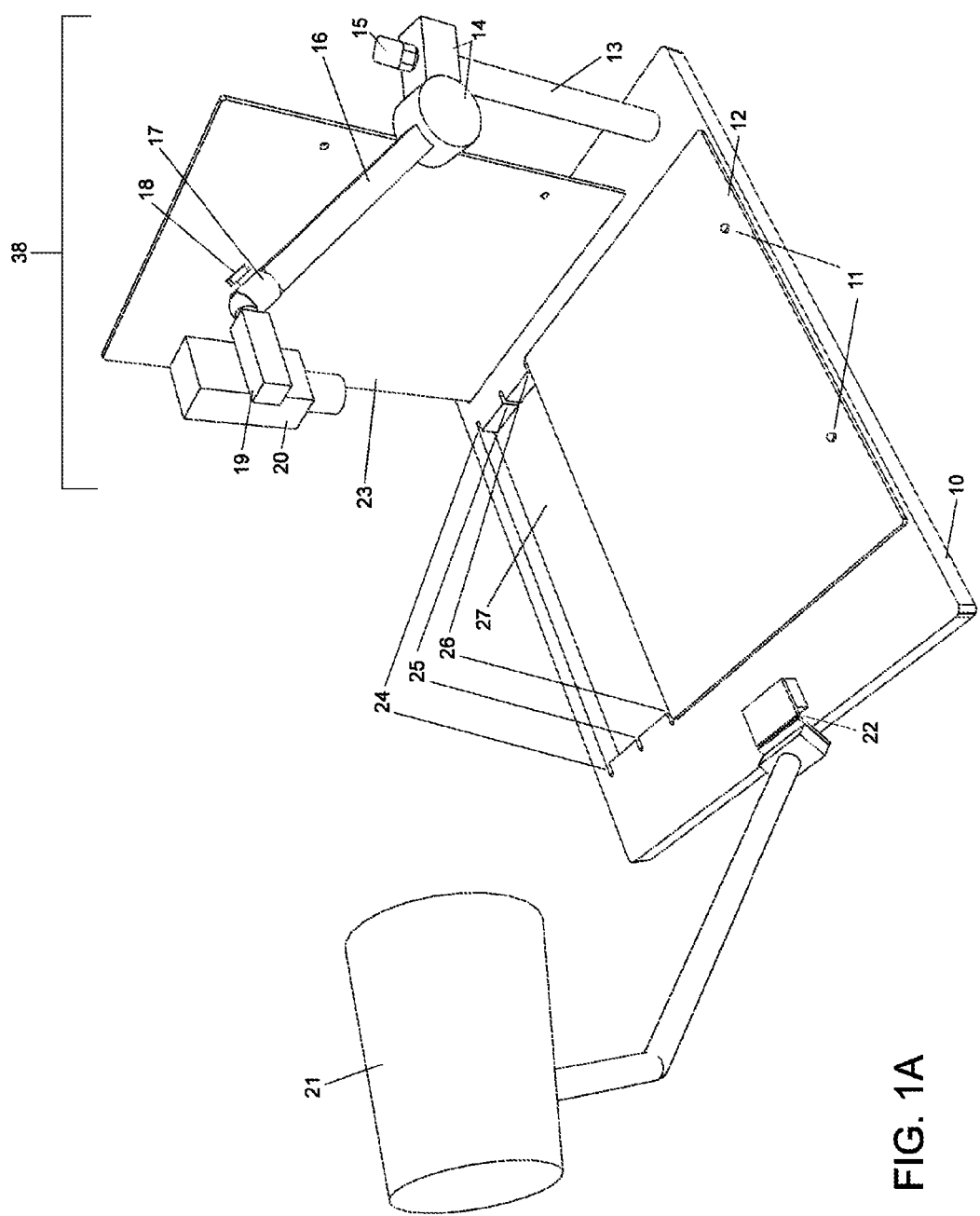
FIG. 1A shows the animation stand positioned so that the camera is shooting down for creating two-dimensional animation.
Figure 1B:
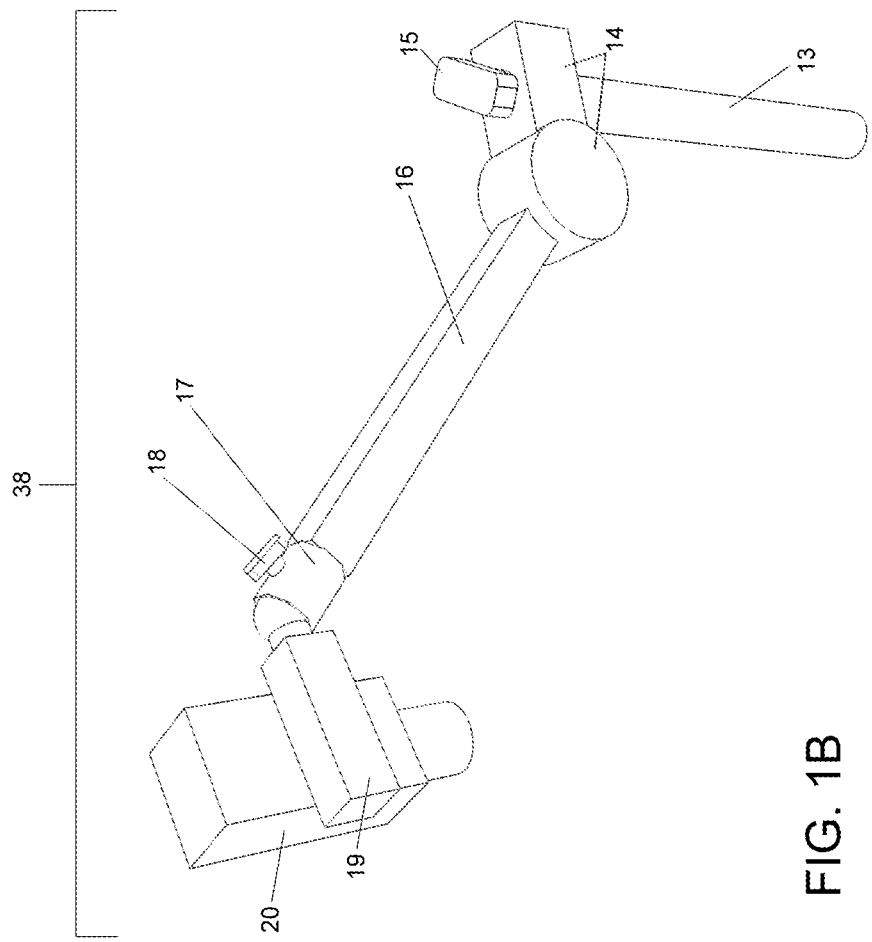
FIG. 1B shows a close-up view of the camera support assembly.

Reference Numerals 10 base
11 registration pegs
12 stage panel
13 vertical arm
14 rotary hinge
15 knob
16 horizontal arm
17 articulating joint
18 knob
19 camera support arm 20 camera
21 light source
22 hinge
23 fill-light panel
24 rear slots
25 middle slots
26 front slots
27 rear floor
28 backdrop panel
29 art platform
30 finger-holes
31 slot in art platform
32 tall art support
33 medium art support
34 short art support
35 foreground art support
36 fill-light panel slot
37 linear bearing
38 camera support assembly

DETAILED DESCRIPTION

FIGS. 1, 2A Through 2C—First Embodiment

One embodiment of the animation stand is illustrated in FIGS. 1A and 1B, and FIGS. 2A through 2C. FIG. 1A shows the animation stand positioned so that the camera is shooting downward for creating two-dimensional animation. A base 10 provides a rigid, planar surface upon which all other parts are attached. Base 10 can be made of plastic, metal, wood or other rigid material. Attached to base 10 are two registration pegs 11 which project above the base. Registration pins can be made of metal, plastic or other machinable material. Registration pegs 11 align with the holes in a stage panel 12 which allows the user to attach stage panel 12 to base 10. Stage panel 12 may be made of plastic, metal, wood, paper or other material and may come in any color. A vertical arm 13 is permanently affixed to base 10. Vertical arm 13 can be cylindrical or rectangular and may be made of metal, wood, plastic or other rigid material. A rotary hinge 14 is attached to vertical arm 13. Rotary hinge 14 can be a standard, off-the-shelf rotary hinge (a rotary hinge being a two-part device in which a moving part can be rotated along one axis relative to a stationary part, and then locked in a new position) and may be made of plastic, metal or other similar material. Rotary hinge 14 includes a knob 15 which allows said rotary hinge to rotate around the vertical axis of vertical arm 13. A horizontal arm 16 is attached to rotary hinge 14. At one end of horizontal arm 16 is an articulating joint 17. Articulating joint 17 can be a standard, off-the-shelf part (such as the Testrite VB-1). A camera support arm 19 is attached to articulating joint 17. Camera support arm 19 can be made of plastic, metal, wood or other rigid material. A knob 18 is attached to articulating joint 17. Knob 18 allows the user to loosen articulating joint 17, allowing camera support arm 19 to be rotated through all axes (X, Y and Z) around the point where said camera support arm intersects with said articulating joint. A camera 20 is attached to camera support arm 19; said camera can be a standard, off-the-shelf video camera, camcorder, digital still camera, film camera or any other device able to capture a succession of still images. (Parts 13 through 19, which support camera 20, are collectively referred to as a camera support assembly 38, which is shown in close-up view in FIG. 1B.)

A light source 21 is attached to base 10 via hinge 22. Light source 21 can be a standard, off-the-shelf light source such as a task lamp. Hinge 22 can be a standard, off-the-shelf hinge such as a friction hinge. A fill-light panel 23 is attached to base 10. At the rear of base 10 are three pairs of slots: rear slots 24, middle slots 25, and front slots 26. A backdrop panel 28 (FIG. 2A), which may be made of plastic, wood, or other rigid material and which may come in any color, may be inserted into any pair of slots 24, 25, or 26; it rests on rear floor 27 which may be made of plastic, wood or other rigid material and which may come in any color.

An art platform 29 (FIG. 2B) can be inserted into base 10. Art platform 29 can be made of wood, plastic, metal or other rigid material. Finger-holes 30 are provided to make it easy to insert and remove art platform 29. Two slots 31 are cut out of art platform 29. Slots 31 accept three art supports: tall art support 32, medium art support 33, and short art support 34; said art supports can be made of plastic, wood, metal or other material. A foreground art support 35 is inserted in front slots 26; said front slots are cut out of base 10.

When the animation stand is positioned for storage or transport (FIG. 2C), a fill-light panel slot 36 can be seen; this slot is cut into base 10.

Operation

FIGS. 1A and 1B, 2A Through 2C

First Embodiment

The animation stand is operated by an animator who sits or stands facing the front edge of base 10 (the edge nearest registration pegs 11). To create two-dimensional animation, the animator positions camera support assembly 38 so that the camera is aimed down toward base 10 and stage panel 12 (FIG. 1A).

The animator adjusts camera support assembly 38 using the following steps. First, turn knob 15 counterclockwise to loosen it, then rotate rotary hinge 14 around the vertical axis of vertical arm 13 so that camera 20 is centered above stage panel 12, then tighten knob 15 to lock said camera. Second, use rotary hinge 14 to adjust the angle of the horizontal arm 16 so that camera 20 is the desired height above stage panel 12. Third, turn knob 18 counterclockwise to loosen articulating joint 17 around camera support arm 19, allowing said camera support arm to be rotated through all axes (X, Y and Z) around the point where said camera support arm intersects with said articulating joint. When camera support arm 19 is in the desired position, knob 18 is re-tightened to lock said camera support arm (with attached camera 20) so it is aligned correctly to stage panel 12 as shown in FIG. 1A.

With camera 20 in this position, the animator can create various techniques of two-dimensional animation, depending on what type of stage panel 12 is used. Dry-erase animation can be created if the animator uses a stage panel 12 made of whiteboard. The animator uses standard dry-erase markers to create a drawing on stage panel 12; then the animator captures a still image of that drawing using camera 20. Next, the animator changes the drawing and captures a still image of the new drawing, and so on. The animation is displayed when the still images are played back in sequence.

With camera 20 positioned as shown in FIG. 1A, the animator can create other two-dimensional animation techniques by inserting a different stage panel 12. For example, the animator can create paper cut-out animation by using a stage panel 12 made of white paper. The animator creates background artwork on that white paper using any traditional art technique. Then the animator creates additional artwork, which is cut into individual pieces and animated on the surface of stage panel 12.

Another two-dimensional technique available with camera 20 positioned as in FIG. 1A involves the animator creating a series of stage panels 12, each of which consists of a separate piece of white paper, each containing a drawing; each drawing is placed on registration pegs 11, a still image is captured of each, resulting in an animation technique referred to as 'cel animation' or 'cartoon animation'.

The positioning shown in FIG. 1A also enables two-dimensional animation to be created using the chroma-key process (the technique that allows a TV meteorologist to be inserted against a weather map). In this case stage panel 12 is a color, for instance blue. Two-dimensional objects that are a color different from stage panel 12 are placed on the stage panel and animated. After animation is completed, a computer is used to insert a digital image in place of the blue background color for each still image that was captured. This results in animation that appears to have been created on the surface of the digital image. So the animation stand in this position allows two-dimensional objects to be animated against any available digital background image.

In addition to the specific examples given above, the positioning shown in FIG. 1A allows the animator to create animation using any two-dimensional object or any two-dimensional art technique, including, but not limited to: watercolor, oil/acrylic painting, finger-painting and other painting techniques, and drawing with media such as pencil, ink, or chalk.

Figure 2A:
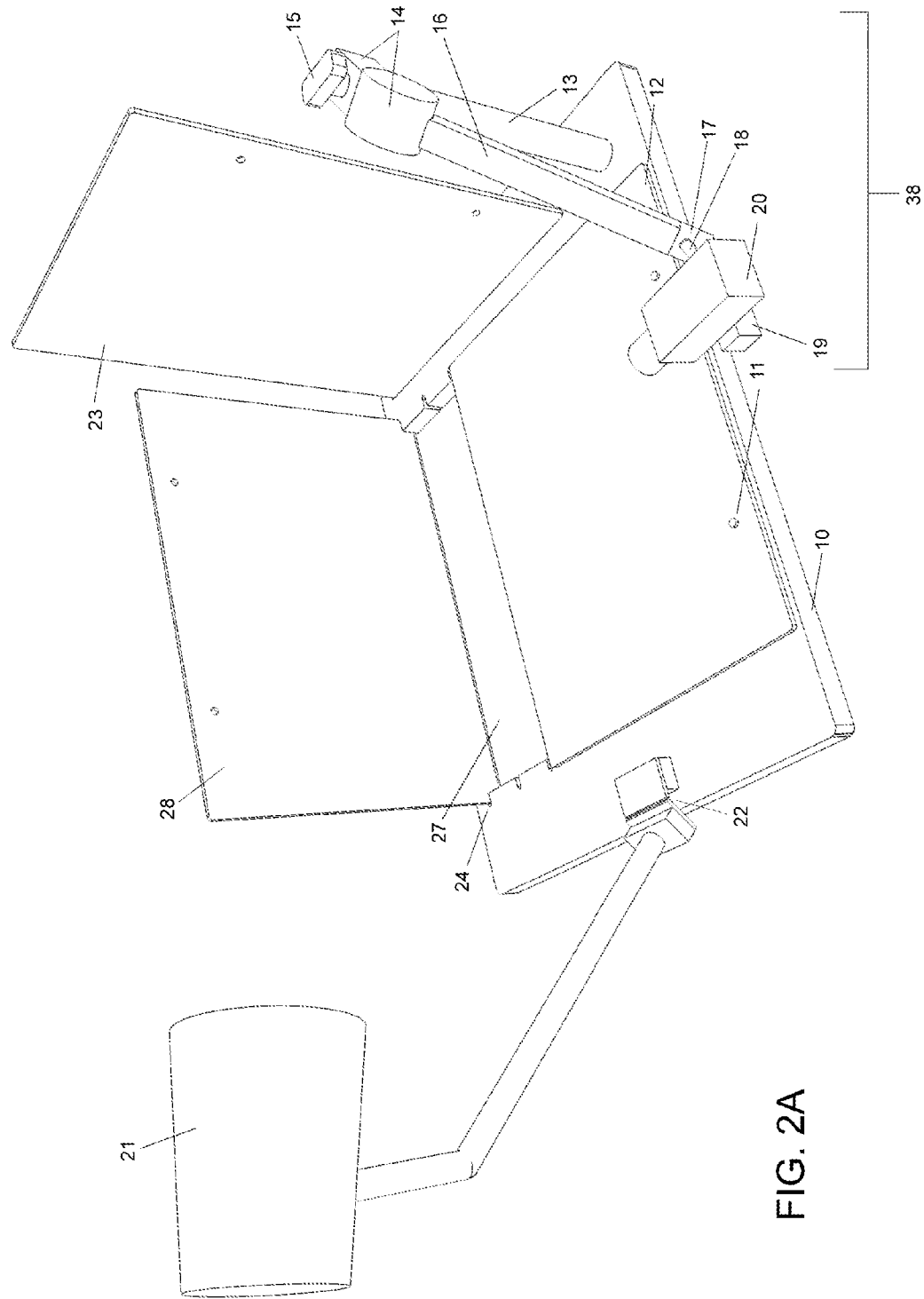
FIG. 2A shows the animation stand positioned so that the camera is shooting horizontally for creating stop-motion animation.

To create stop-motion animation of three-dimensional objects, the animator adjusts the animation stand so that it is in approximately the position shown in FIG. 2A, using the following steps. First, loosen knob 15 and rotate rotary hinge 14 so that camera 20 is centered above the front edges of base 10 and stage panel 12 (the edges nearest registration pegs 11), then tighten knob 15. Second, use rotary hinge 14 to adjust the angle of the horizontal arm 16 so that camera 20 is just slightly above stage panel 12. Third, loosen knob 18 and adjust camera support arm 19 (with attached camera 20) so it is aligned correctly to stage panel 12 as shown in FIG. 2A. Fourth, the animator inserts backdrop panel 28 into rear slot 24 to provide a background for the animation.

Using this positioning of the animation stand, the animator can create a variety of stop-motion animation techniques. For example, figures depicting animals or people and having movable arms and legs, can be moved and re-positioned by the animator. After each movement a new still image is captured. When the sequence of images is played back, the result is stop-motion animation.

The positioning shown in FIG. 2A also enables stop-motion animation using the chroma-key process. In this case stage panel 12 and backdrop panel 28 are the same color, for instance green. Three-dimensional objects that are a color different from stage panel 12 and backdrop panel 28 are placed on said stage panel and animated. After animation is completed, a computer is used to insert a digital image in place of the green background color. So in this position, the animation stand allows three-dimensional objects to be animated against any available digital background image.

When the animation stand is positioned as shown in FIG. 2A, virtually any stop-motion animation technique can be created, including but not limited to, clay animation, puppet animation, animation of foam-latex figures, animation of toys, and animation of everyday objects (both naturally-occurring and man-made); also, time-lapse animation can be created (for example, animation showing a seed germinating or a flower growing). The animation can be created with a variety of backgrounds, because any artwork can be affixed to stage panel 12 and backdrop panel 28. For example, background artwork of items such as grass and pavement can be affixed to stage panel 12, and background artwork of items such as trees, clouds, and sky can be affixed to backdrop panel 28.

Figure 2B:
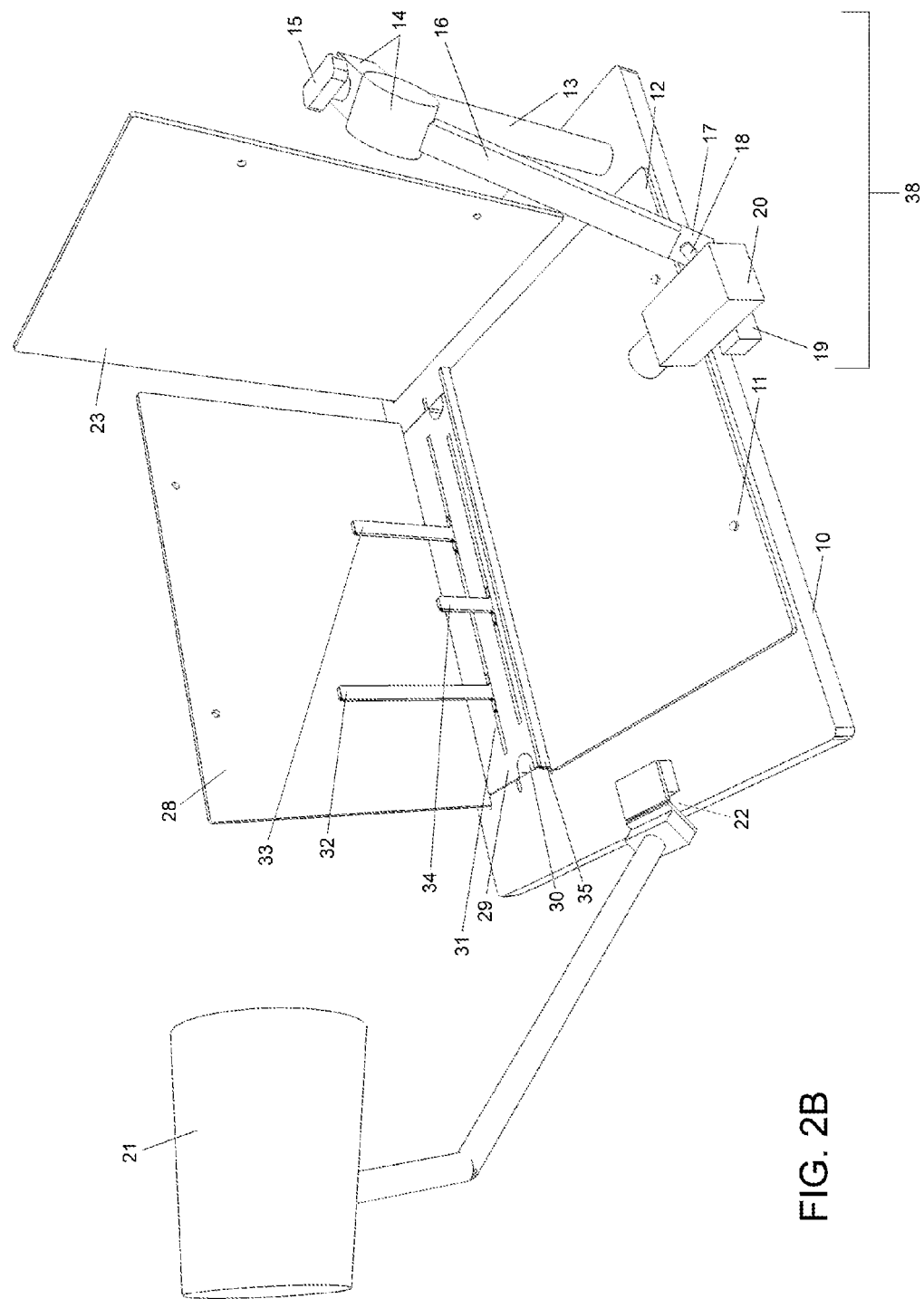
FIG. 2B shows the animation stand positioned so that the camera is shooting horizontally for creating stop-motion animation, and shows the art platform and art supports.

The animation stand can be configured as illustrated in FIG. 2B to allow greater flexibility in providing both stationary and moving backgrounds. The animator does this following these steps. First, the animator inserts a finger into each finger-hole 30 and lowers art platform 29 into the opening at the rear of base 10. Second, the animator inserts the art supports (tall art support 32, medium art support 33, and short art support 34) into slots 31 of art platform 29. Third, the animator inserts foreground art support 35 into front slots 26. Next, the animator creates background artwork such as grass and pavement and affixes that to stage panel 12, and creates background artwork such as trees, clouds and sky and affixes those to backdrop panel 28. In addition, smaller artwork such as individual houses, trees, light poles, etc can be created and affixed to art supports 32, 33, and 34. This gives the scene a greater sense of depth. While animation is being done, the animator can move art supports 32, 33, and 34 to the left or right a small amount before each still image is captured, so that background artwork will appear to move when the animation is played back.

Figure 2C:
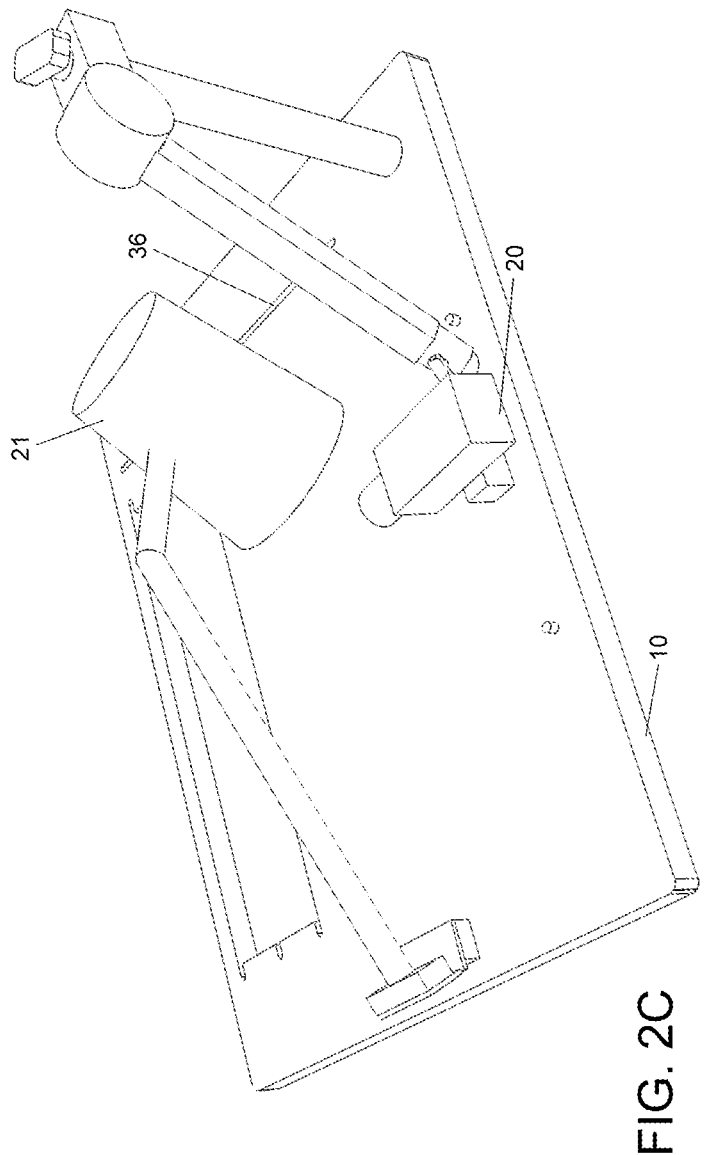
FIG. 2C shows the animation stand positioned for storage or transport.

The animation stand can be positioned for storage or transportation as shown in FIG. 2C. The fill-light panel has been removed from fill-light panel slot 36 in base 10. All other panels have been removed from base 10. Light source 21 has been folded against base 10. Camera 20 is positioned near base 10 for storage or transport.

ADVANTAGES

From the description above, a number of advantages of the animation stand become evident:
- (a) Unlike prior devices, the animation stand can be used to produce both two-dimensional and stop-motion animation.
- (b) It is easy for the animator to change the animation stand from two-dimensional animation positioning to stop-motion animation positioning.
- (c) The animation stand can be used to create two-dimensional animation using virtually any two-dimensional art technique.
- (d) The animation stand can be used to create stop-motion animation using virtually any physical figure or object.
- (e) The animation stand offers a variety of methods for affixing backgrounds made using any art technique.
- (f) The animation stand allows the use of chroma-key technology for inserting any available digital image into the background of two-dimensional or stop-motion animation projects.
- (g) The animation stand's art platform and art supports give the animator the opportunity to add a sense of depth to the scene.
- (h) The animation stand's art platform and art supports allow the animator to easily create moving backgrounds.
- (i) The animation stand's ease of operation allows it to be used by people with little or no animation experience.
- (j) The animation stand's compact, all-in-one design is safer to use than stop-motion animation configurations that rely on a camera attached to a tripod and lights attached to light stands, which result in power cords extending along the floor for several feet.
- (k) The animation stand is easy to store and transport.

DETAILED DESCRIPTION

Figure 3:
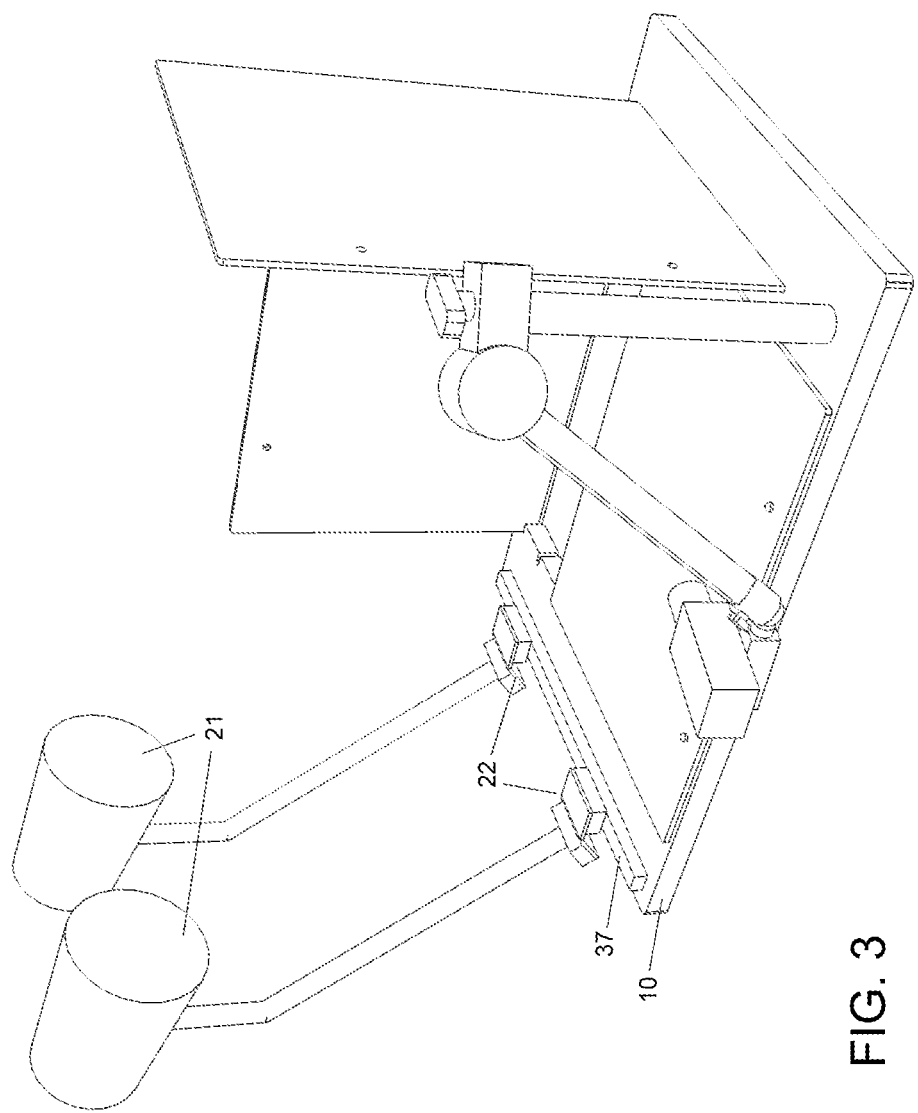
FIG. 3 shows a second embodiment of the animation stand with two light sources.

FIG. 3—Second Embodiment

A second embodiment of the animation stand is shown in FIG. 3. This embodiment is similar to the first embodiment, except that there are two light sources 21, each of which is mounted attached to a hinge 22, each of which is mounted on a standard, off-the-shelf linear bearing 37 which is attached to base 10.

Operation

FIG. 3—Second Embodiment

The light source arrangement shown in FIG. 3 allows the animator to slide light sources 21 along linear bearing 37 so that said light sources can be positioned differently for each scene that is animated. This embodiment also allows the animator to light backdrop panel 28 differently from the way stage panel 12 is lit, which is advantageous when high-quality chroma-keys are desired.

CONCLUSION, RAMIFICATIONS, AND SCOPE

Accordingly, it can be seen that, according to one embodiment of the invention we have provided a new animation stand which is unique in that it provides a multiple axis camera support which allows creation of both two-dimensional and stop-motion animation. Said animation stand is easy to use, even by those who have no animation experience. It provides multiple methods of affixing backgrounds, both stationary and animated. It is well suited to using chroma-key effects to insert any digital background into a scene. The animation stand folds for storage and travel. It offers safe operation.

Although the above description contains many specificities, these should not be construed as limitations on the scope of the embodiment. Many other ramifications and variations are possible. For example, the dimensions of the animation stand could be changed; or some parts could be made so that they can be telescoped. The animation stand can be used for purposes other than animation, such as for creating still photographs of merchandise offered for sale.

The two embodiments shown are two examples of the way the animation stand can be manufactured. These examples are not meant to limit the animation stand to these configurations; other embodiments are possible.

Thus the scope of the invention should be determined by the appended claims and their legal equivalents, and not by the examples given.

The invention claimed is:

1. An animation stand for two-dimensional and stop-motion animation, comprising:
   a. a planar base having a bottom surface and a top surface;
   b. a planar stage panel mounted flat to the top surface of said base;
   c. a planar backdrop panel mounted perpendicular to said base;
   d. a vertical arm having a top end and a bottom end, with the bottom end mounted to said base;
   e. a rotary hinge having a vertical arm end and a horizontal arm end, with the vertical arm end mounted at the top end of said vertical arm, pivotable around the vertical axis of said vertical arm;
   f. a horizontal arm having a rotary hinge end and an articulating joint end, with the rotary hinge end mourned to the horizontal arm end of said rotary hinge; and
   g. an articulating joint having a horizontal arm end and a camera support arm end, with the horizontal arm end mourned to the articulating joint end of said horizontal arm.

2. An animation stand as claimed in claim 1, further comprising:
   a. a camera support arm having an articulating joint end and a camera end, with the articulating joint end mounted to said articulating joint; and
   b. a camera mounted to the camera end of said camera support arm such that said camera is enabled to be disposed at an angle of between zero and 90 degrees to said base so that said camera can photograph said stage panel, or said backdrop panel or both panels simultaneously;
   whereby said animation stand can be used to create both two-dimensional and stop-motion animation.

3. An animation stand as claimed in claim 1, further comprising:
   a camera positioning means in which a camera support assembly enables a camera to be disposed at an angle of between zero and 90 degrees to said base so that camera can photograph said stage panel, or said backdrop panel or both panels simultaneously;
   whereby said animation stand can be used to create both two-dimensional and stop-motion animation.

4. An animation stand for two-dimensional and stop-motion animation, comprising:
   a. a planar base having a bottom surface and a top surface;
   b. a planar stage panel mounted flat to the top surface of said base;
   c. a planar backdrop panel mounted perpendicular to said base;
   d. a hinge having a base hinge leaf with a bottom surface and a top surface and a light source hinge leaf having a bottom surface and a top surface;
   e. the bottom surface of the said base hinge leaf mounted to said base; and
   f. a light source mounted to the top surface of said light source hinge leaf; so that said light source is enabled to be uniaxially pivotable;
   whereby said stage panel and said backdrop panel are illuminated by said light source.

* * * * *